Aug. 25, 1931.  A. F. MASURY  1,820,752
VENTILATING DEVICE FOR GARBAGE, ASH, AND REFUSE TRUCKS
Filed March 21, 1930
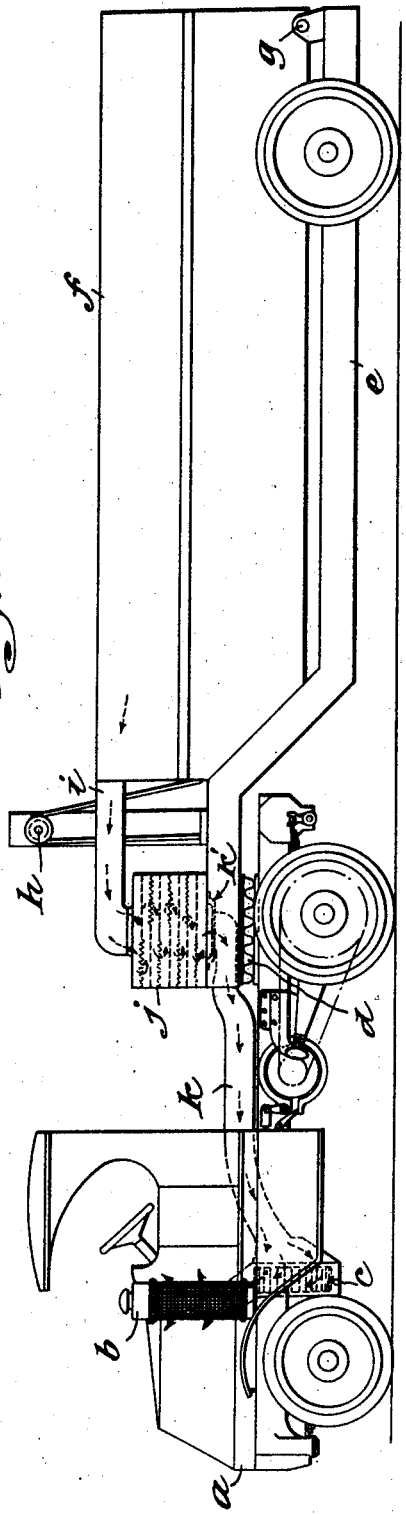
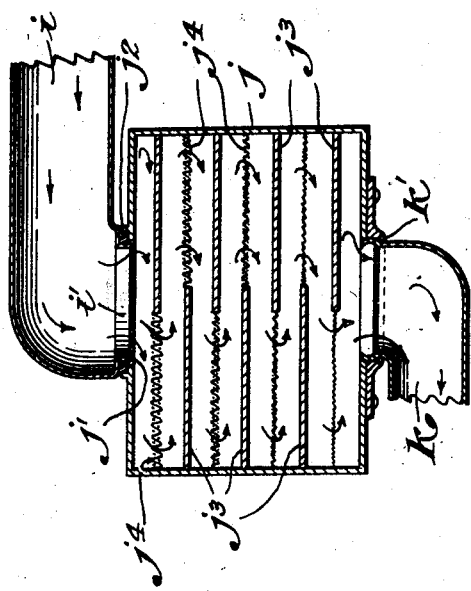
Inventor:
Alfred F. Masury
By his Attorneys
Redding, Greeley, O'Shea & Campbell Patented Aug. 25, 1931

1,820,752

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

VENTILATING DEVICE FOR GARBAGE, ASH, AND REFUSE TRUCKS

Application filed March 21, 1930. Serial No. 437,797.

The present invention relates to motor vehicles and embodies, more specifically, an improved vehicle of the commercial class adapted to transport refuse, etc. More specifically, the invention embodies an improved ventilating device for vehicles of the above character and incorporates in the ventilating structure, a portion of the usual cooling mechanism for the engine.

Little need be said of the disagreeable odor caused by open trucks collecting garbage, etc., and the present invention seeks to provide a vehicle for collecting and transporting such material without causing any offensive odors to be present in the vicinity of the vehicle.

An object of the invention, accordingly, is to provide a vehicle for collecting and transporting refuse, etc., such vehicle being so constructed as to prevent the existence of offensive odors in the vicinity thereof.

A further object of the invention is to provide a vehicle of the above character having a closed body and a ventilating device by means of which the offensive odors usually present are eliminated.

A further object of the invention is to provide a ventilating device for closed vehicle bodies of the above character by means of which the engine cooling system is employed to ventilate the closed body and prevent the existence of offensive odors in the vicinity thereof.

Further objects, not specifically enumerated above, will be apparent as the invention is described in greater detail in connection with the accompanying drawings, wherein:

Figure 1 is a view in side elevation showing a vehicle provided with a closed body and a ventilating system constructed in accordance with the present invention.

Figure 2 is a view in section, taken through the ventilating device shown in Figure 1.

Referring to the above drawings, a tractor is shown at $a$ having an internal combustion engine, the cooling of which is effected by means of a radiator $b$. A squirrel cage fan is shown at $c$ for directing a flow of cooling air through the radiator in a well known manner.

Mounted upon a fifth wheel $d$ is a trailer $e$ which is preferably provided with a closed body $f$ hinged at $g$ for dumping in the usual manner. A dumping mechanism $h$ may be provided and is driven in any well known manner, the details of such drive forming no part of the present invention.

Communicating with the forward end of the closed body $f$ is a ventilating duct $i$ formed with a reduced and flanged port $i'$, as shown in Figure 2. Upon the forward extremity of the trailer frame $e$, an air cleaning chamber $j$ is provided, this chamber having an aperture $j'$ at the upper extremity thereof and carrying a sealing washer $j^2$. Under normal conditions, the port $i'$ of the ventilating duct $i$ rests upon the sealing washer $j^2$ and thus affords a communication between the closed body $f$ and the chamber $j$.

An air duct $k$ is carried by the tractor and provides communication between the fan $c$ and the bottom of the chamber $j$. A universal joint $k'$ preferably constitutes the connection between duct $k$ and chamber $j$ in order to accommodate the movement of the trailer with respect to the tractor, the universal joint being in the axis of the fifth wheel $d$.

Within the chamber, alternate staggered baffles $j^3$ are provided, oiled screens $j^4$ being associated therewith to filter and clean the air as it passes through the chamber $j$. These screens are of graduated meshes preferably varying from one quarter inch to one sixty fourth inch mesh.

From the foregoing, it will be seen that the fan $c$ draws air from the body $f$ through the cleaner $j$ and forces it through the engine radiator to effect the cooling of the water in the usual manner. In this manner, the body $f$ will be effectively ventilated and no offensive odors will be present in the vicinity of the vehicle.

While the invention has been described with specific reference to the accompanying drawings, it is not to be limited, save as defined in the appended claim.

I claim as my invention:

A tractor, a flow creating means thereon, a trailer mounted on the tractor through a fifth wheel connection, a closed body hingedly mounted on the trailer for dumping, an air cleaner on the trailer coaxial with the fifth wheel, a duct between the flow creating means and the cleaner, a universal joint connecting the duct with the cleaner, and a duct removable from the cleaner and communicating between the cleaner and body.

This specification signed this 18th day of March A. D. 1930.

ALFRED F. MASURY.